US010657658B2

United States Patent
Kobayashi et al.

(10) Patent No.: US 10,657,658 B2
(45) Date of Patent: May 19, 2020

(54) TRANSFORMATION MATRIX DERIVING DEVICE, POSITION ESTIMATION APPARATUS, TRANSFORMATION MATRIX DERIVING METHOD, AND POSITION ESTIMATION METHOD

(71) Applicant: Kabushiki Kaisha Toshiba, Minato-ku (JP)

(72) Inventors: Daisuke Kobayashi, Kunitachi (JP); Toshiaki Nakasu, Chofu (JP); Shihomi Takahashi, Yokohama (JP); Kazushige Ouchi, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 146 days.

(21) Appl. No.: 15/911,262

(22) Filed: Mar. 5, 2018

(65) Prior Publication Data

US 2018/0374222 A1    Dec. 27, 2018

(30) Foreign Application Priority Data

Jun. 23, 2017 (JP) .................................. 2017-122846

(51) Int. Cl.
*G06T 7/262* (2017.01)
*G06T 7/70* (2017.01)
(Continued)

(52) U.S. Cl.
CPC ............. *G06T 7/262* (2017.01); *A63F 13/213* (2014.09); *A63F 13/655* (2014.09); *G06F 3/011* (2013.01);
(Continued)

(58) Field of Classification Search
CPC ............. G06K 2209/21; G06K 9/3241; G06K 9/00724; G06T 2207/10016;
(Continued)

(56) References Cited

U.S. PATENT DOCUMENTS 5,850,489 A * 12/1998 Rich ..................... G06T 11/203
382/304
5,892,520 A * 4/1999 Ioka ..................... G06F 16/786
345/474
(Continued)

FOREIGN PATENT DOCUMENTS

JP     5-363752      12/2013
JP     2013-251800   12/2013
(Continued)

OTHER PUBLICATIONS

Shogo Aizawa et al., "Examination of the concealment section interpolation in the soccer picture using the similarity of the moving trace of the player" IEICE Technical Report, vol. 115 No. 495, pp. 241-242, 2016, 7 pages.

*Primary Examiner* — Anner N Holder
(74) *Attorney, Agent, or Firm* — Oblon, McClelland, Maier & Neustadt, L.L.P.

(57) ABSTRACT

According to an embodiment, a transformation matrix deriving device includes a first trajectory generator, a second trajectory generator, a trajectory matcher, and a deriver. The first trajectory generator is configured to generate a first trajectory of a moving object, detected from a video, in a first coordinate system. The second trajectory generator is configured to generate a second trajectory of a moving object in a second coordinate system, from time-series data of positional information. The trajectory matcher is configured to associate the first trajectory with the second trajectory to be a motion trajectory of the same moving object based on a similarity between the first trajectory and the second trajectory. The deriver is configured to derive a transformation matrix that transforms the second coordinate
(Continued)

system into the first coordinate system by using the first trajectory and the second trajectory associated with each other.

10 Claims, 7 Drawing Sheets

(51) Int. Cl.
*A63F 13/655* (2014.01)
*A63F 13/213* (2014.01)
*G06K 9/00* (2006.01)
*G06K 9/32* (2006.01)
*G06F 3/01* (2006.01)
*G06F 3/03* (2006.01)
*H04N 5/232* (2006.01)

(52) U.S. Cl.
CPC ....... *G06F 3/0304* (2013.01); *G06K 9/00724* (2013.01); *G06K 9/3241* (2013.01); *G06T 7/70* (2017.01); *H04N 5/23229* (2013.01); *A63F 2300/69* (2013.01); *G06K 2209/21* (2013.01); *G06T 2207/10016* (2013.01); *G06T 2207/30224* (2013.01)

(58) Field of Classification Search
CPC . G06T 2207/30224; G06T 7/262; G06T 7/70; H04N 5/23229; A63F 13/213; A63F 13/655; A63F 2300/69; G06F 3/011; G06F 3/0304
See application file for complete search history.

(56) References Cited

U.S. PATENT DOCUMENTS

| | | | | |
|---|---|---|---|---|
| 5,912,671 A | * | 6/1999 | Oka | G06T 15/80 345/427 |
| 6,108,460 A | * | 8/2000 | Rich | G06T 1/20 345/418 |
| 6,385,772 B1 | * | 5/2002 | Courtney | G08B 13/19602 348/143 |
| 6,751,242 B2 | * | 6/2004 | Kaneko | H01S 5/18311 372/27 |
| 2008/0256158 A1 | * | 10/2008 | Pelletier | G06T 13/00 708/401 |
| 2009/0244309 A1 | * | 10/2009 | Maison | G06K 9/00369 348/222.1 |
| 2012/0206597 A1 | * | 8/2012 | Komoto | G06K 9/00805 348/135 |
| 2013/0325887 A1 | | 12/2013 | Takaoka | |
| 2015/0039217 A1 | * | 2/2015 | Deshpande | G08G 1/20 701/300 |
| 2016/0225121 A1 | * | 8/2016 | Gupta | G06T 3/00 |
| 2017/0180703 A1 | * | 6/2017 | Kovacovsky | G01S 17/46 |
| 2018/0144479 A1 | | 5/2018 | Nakasu et al. | |
| 2019/0281236 A1 | * | 9/2019 | Kovacovsky | H04N 13/246 |

FOREIGN PATENT DOCUMENTS

| | | |
|---|---|---|
| JP | 2016-099941 | 5/2016 |
| JP | 2018-81630 A | 5/2018 |
| WO | WO 2007/130793 A2 | 11/2007 |
| WO | WO 2007/130793 A3 | 11/2007 |

\* cited by examiner

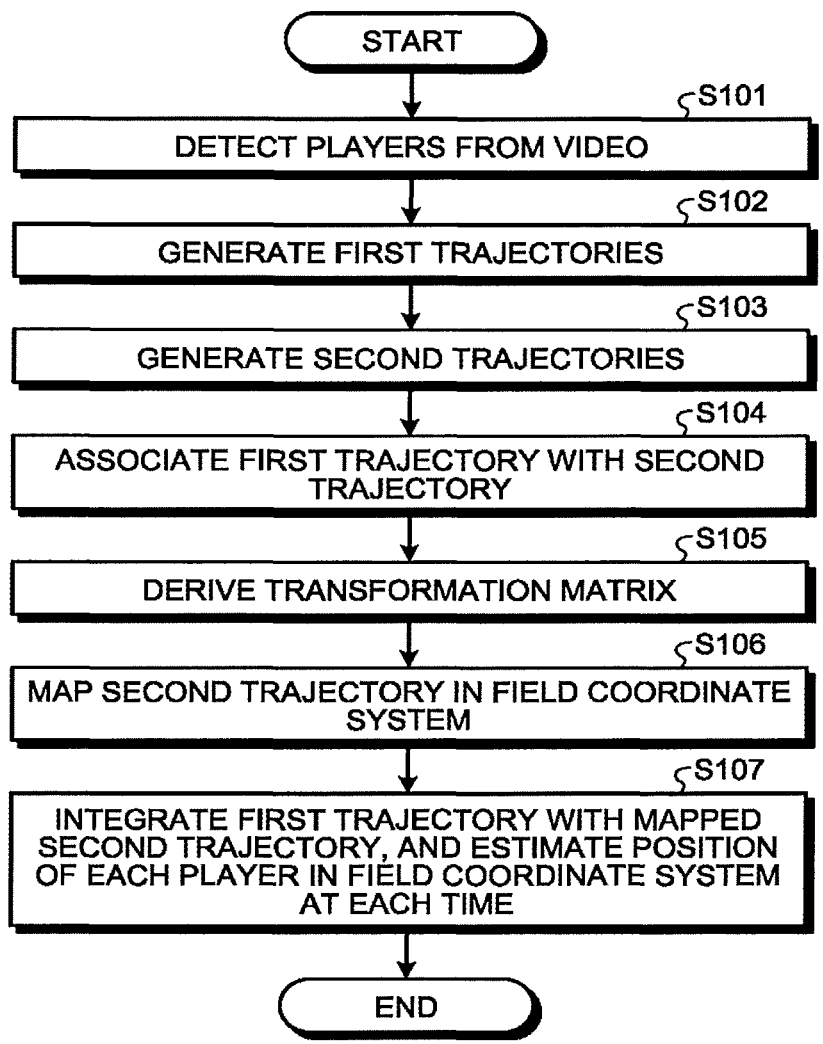

TRANSFORMATION MATRIX DERIVING DEVICE, POSITION ESTIMATION APPARATUS, TRANSFORMATION MATRIX DERIVING METHOD, AND POSITION ESTIMATION METHOD

CROSS-REFERENCE TO RELATED APPLICATIONS

This application is based upon and claims the benefit of priority from Japanese Patent Application No. 2017-122846, filed on Jun. 23, 2017; the entire contents of which are incorporated herein by reference.

FIELD

An embodiment described herein relates generally to a transformation matrix deriving device, a position estimation apparatus, a transformation matrix deriving method, and a position estimation method.

BACKGROUND

Technologies of analyzing a video captured by a camera and tracking a moving object in the video to analyze the motion of the moving object are known. In sport video analysis, for example, a video of a game such as a soccer game or a rugby game is captured to analyze the motion of the players or the motion of a ball, and the user can analyze a certain scene of the game or use the analysis as information for reinforcing the team.

To correctly analyze the motion of a moving object, it is important to accurately estimate the position of the moving object at each instant of time. However, in a video captured by a camera, in some cases, a moving object being tracked cannot be detected for a certain time period because of occlusion, or because the moving object moves away from the capture range of the camera. In this case, it is difficult to accurately estimate the position of the moving object at each instant of time by only using a video captured by a camera, and thus, further improvements are needed.

BRIEF DESCRIPTION OF THE DRAWINGS

FIG. 10 is a flowchart illustrating an example operation of the position estimation apparatus according to the embodiment.

DETAILED DESCRIPTION

Figure 1:
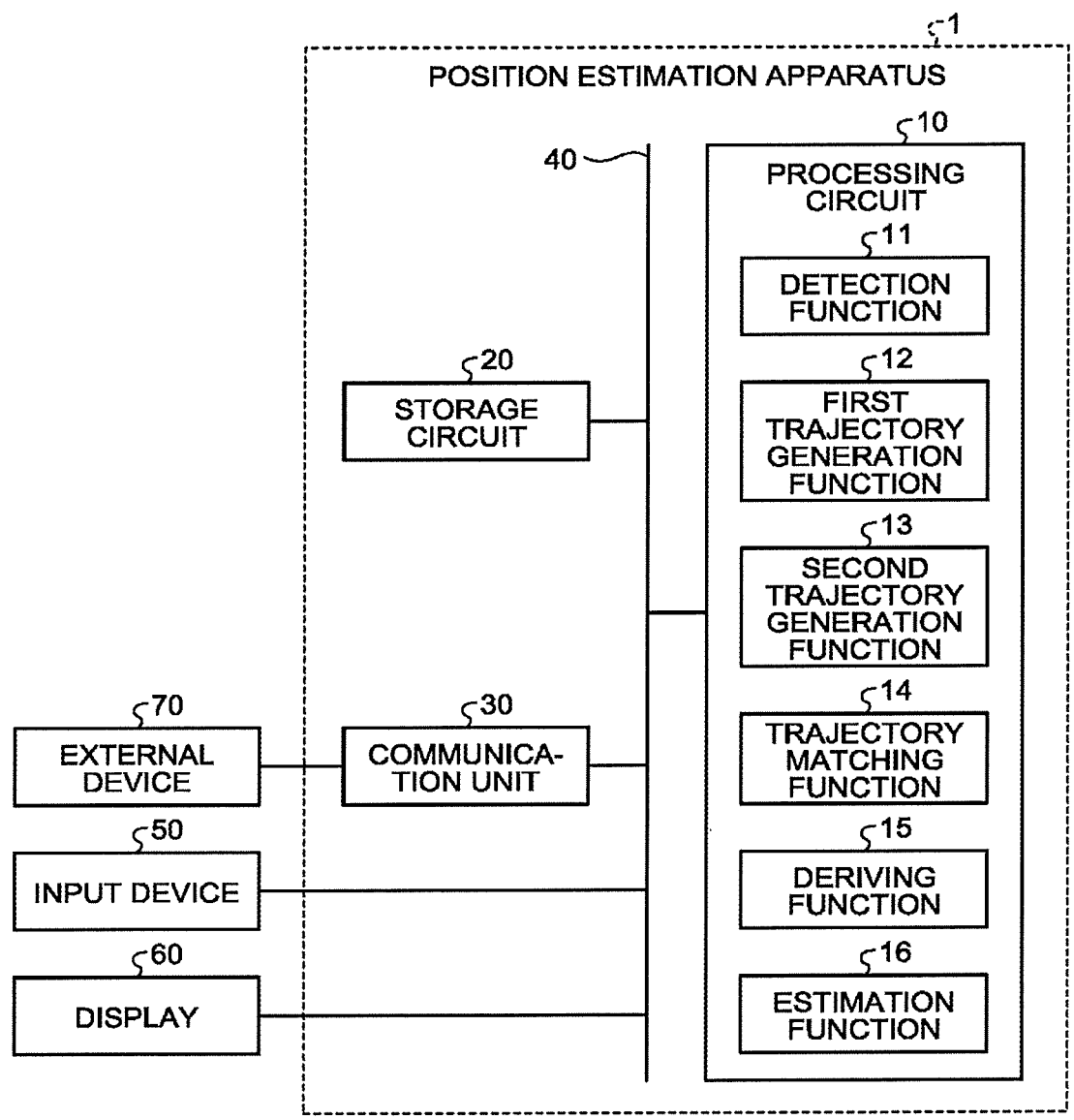
FIG. 1 is a block diagram illustrating an example configuration of a position estimation apparatus according to an embodiment.

According to an embodiment, a transformation matrix deriving device includes a first trajectory generator, a second trajectory generator, a trajectory matcher, and a deriver. The first trajectory generator is configured to generate a first trajectory that is a motion trajectory of a moving object in a first coordinate system, the moving object being detected from a video. The second trajectory generator is configured to generate a second trajectory from time-series data of positional information output from a position sensor, the second trajectory being a motion trajectory of a moving object having the position sensor in a second coordinate system. The trajectory matcher is configured to associate the first trajectory with the second trajectory, the first trajectory and the second trajectory being estimated to be a motion trajectory of the same moving object based on a similarity between the first trajectory and the second trajectory. The deriver is configured to derive a transformation matrix that transforms the second coordinate system into the first coordinate system by using the first trajectory and the second trajectory associated with each other.

The following fully describes a transformation matrix deriving device, a position estimation apparatus, a transformation matrix deriving method, and a position estimation method according to an embodiment with reference to the accompanying drawings. The following describes an application example of the embodiment to sport video analysis. In this example, a position of a player (an example of a "moving object") in a game in a field coordinate system (an example of a "first coordinate system") is estimated for each instant of time. The field coordinate system has the origin at a certain location in a field of a game (e.g., at one of intersections of the side lines and the end lines), and represents a position in the field by using distances (e.g., unit in meters) from the origin in the x direction (e.g., direction parallel to the side lines) and y direction (e.g., direction parallel to the end lines).

The game is captured by, for example, a single camera. The camera's capture range is smaller than the entire field of the game. At least some of the players who are participating in the game are equipped with a position sensor such as a global positioning system (GPS) sensor that outputs positional information indicating the position of the players in a geographic coordinate system (an example of a "second coordinate system") at regular intervals. The geographic coordinate system represents a position by latitude and longitude.

In the present embodiment, the processing to be described later will be performed by the position estimation apparatus after the game is over. That is, a video of a game captured by a camera and time-series data of the positional information output from the position sensors during the game are stored, for example, in an external storage that is provided outside of the position estimation apparatus according to the present embodiment. Upon performing the processing to be described later, the position estimation apparatus according to the present embodiment acquires the video of the game captured by the camera and the time-series data of the positional information output from the position sensors from the external device. The position estimation apparatus according to the present embodiment may acquire the video of the game and the time-series data of positional information directly from the camera and the position sensors. In this case, the video and the time-series data of positional information may be temporarily stored in an internal storage circuit of the position estimation apparatus, and the processing to be described later may be performed after the game, or the processing can be performed on an ongoing basis.

FIG. 1 is a block diagram illustrating an example configuration of a position estimation apparatus 1 according to the present embodiment. The position estimation apparatus 1 is configured by, for example, a special-purpose or general-purpose computer, and includes, as illustrated in FIG. 1, a processing circuit 10, a storage circuit 20, a communication unit 30, and a bus 40 that connects these units. To the position estimation apparatus 1, for example, an input device 50 and a display 60 are wired or wirelessly connected. The position estimation apparatus 1 is connected to an external device 70 via the communication unit 30.

The processing circuit 10 includes a detection function 11, a first trajectory generation function 12, a second trajectory generation function 13, a trajectory matching function 14, a deriving function 15, and an estimation function 16. Further details of these processing functions will be described later. Although FIG. 1 illustrates example main processing functions according to the present embodiment, the processing circuit 10 may further include other functions in addition to the processing functions.

The processing functions implemented in the position estimation apparatus 1 are stored in the storage circuit 20 in the form of, for example, computer programs executable by a computer. The processing circuit 10 is a processor that reads a computer program from the storage circuit 20 and executes it to implement a processing function corresponding to the computer program. Upon reading the computer programs, the processing circuit 10 has the processing functions as illustrated in FIG. 1.

In FIG. 1, the detection function 11, the first trajectory generation function 12, the second trajectory generation function 13, the trajectory matching function 14, the deriving function 15, and the estimation function 16 are implemented by the single processing circuit 10, but the processing circuit 10 may be configured by combining a plurality of independent processors. In this case, these processing functions may be configured as computer programs, or a certain function may be implemented by a dedicated, independent program execution circuit.

The "processor" described above indicates, for example, a general-purpose processor such as a central processing unit (CPU) or a graphical processing unit (GPU), or a circuit such as an application specific integrated circuit (ASIC) or a programmable logic device (e.g., a simple programmable logic device (SPLD), a complex programmable logic device (CPLD), and a field programmable gate array (FPGA)). The processor reads a computer program stored in the storage circuit 20 and executes it to implement a function. The computer programs may be directly incorporated in a circuit of the processor instead of being stored in the storage circuit 20. In this case, the processor reads the computer programs stored in the circuit and executes them to implement the functions.

The storage circuit 20 stores therein as necessary, for example, data for use in the processing functions of the processing circuit 10. The storage circuit 20 according to the present embodiment stores therein computer programs for implementing the processing functions of the processing circuit 10 and a video of a game and time-series data of positional information acquired from the external device 70 via the communication unit 30. For example, the storage circuit 20 is, for example, a random-access memory (RAM), a semiconductor memory device such as a flash memory, a hard disk, or an optical disc. Instead of using the storage circuit 20, a storage device external to the position estimation apparatus 1 may be used. The storage circuit 20 may be a storage medium that stores or temporarily stores computer programs delivered and downloaded via a local area network (LAN) or the Internet. The storage medium may be configured by a single medium or by a plurality of media.

The communication unit 30 acquires, from the external device 70 that is wired or wirelessly connected to the communication unit 30, a video of a game captured by a camera and time-series data of positional information output from the position sensors attached to the players during the game and stores the acquired video and data in the storage circuit 20. The communication unit 30 may communicate with the external device 70 by connecting to a network to acquire the video and the time-series data of the positional information.

The input device 50 receives various types of instructions and information input from an operator. The input device 50 is, for example, a pointing device such as a mouse or a trackball, or an input device such as a keyboard.

The display 60 is a display device such as a liquid crystal display device that displays various types of information. In the present embodiment, the display 60 can display a video of a game captured by a camera and a post-processed video.

Described next is the processing functions of the processing circuit 10. The processing circuit 10 reads a video of a game, time-series data of positional information, and the computer programs from the storage circuit 20 upon, for example, instruction from the operator through the input device 50, and sequentially executes the processing of the detection function 11, the first trajectory generation function 12, the second trajectory generation function 13, the trajectory matching function 14, the deriving function 15, and the estimation function 16 to be described later. The entire time period of the game is divided into certain time units (e.g., a minute), and a series of processes of the processing functions to be described later are performed in each unit time.

Figure 2:
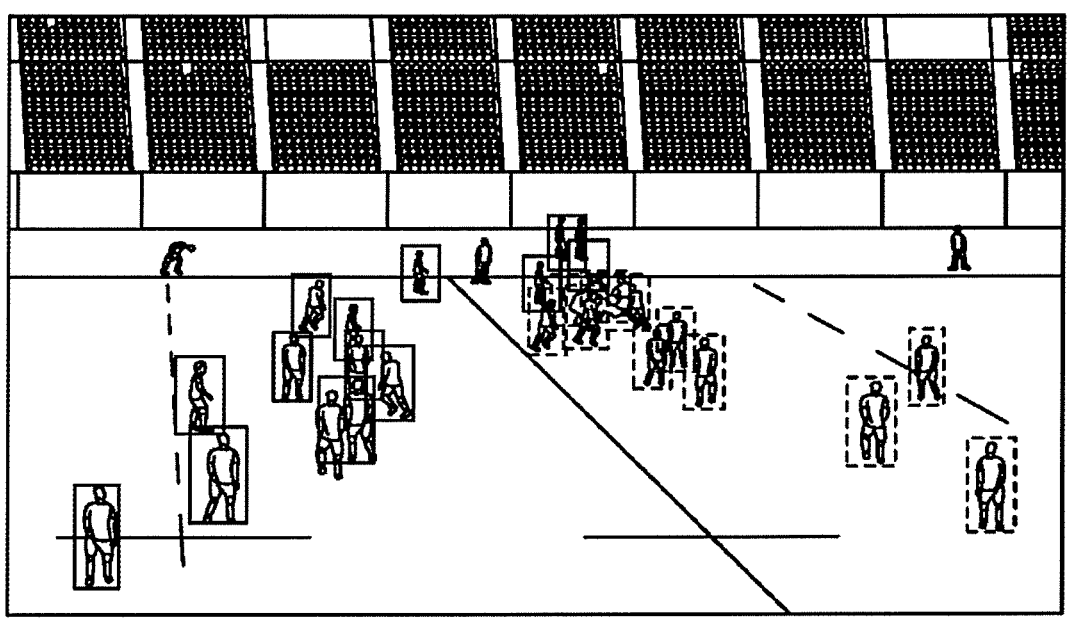
FIG. 2 is a diagram illustrating a video from which players are detected.

The detection function 11 detects players that are moving objects from a video of a game captured by a camera. The detection function 11 may detect the players from the video of a game by using an object detection algorithm known as an image processing technology. FIG. 2 illustrates a video from which the players are detected by the detection function 11. Rectangular areas in FIG. 2 are object-detecting areas indicating that players in the game are detected from the video. The detection function 11 repeats a process of detecting a player from the video every time an amount of motion in a frame or between frames of the video exceeds a reference value.

Figure 3:
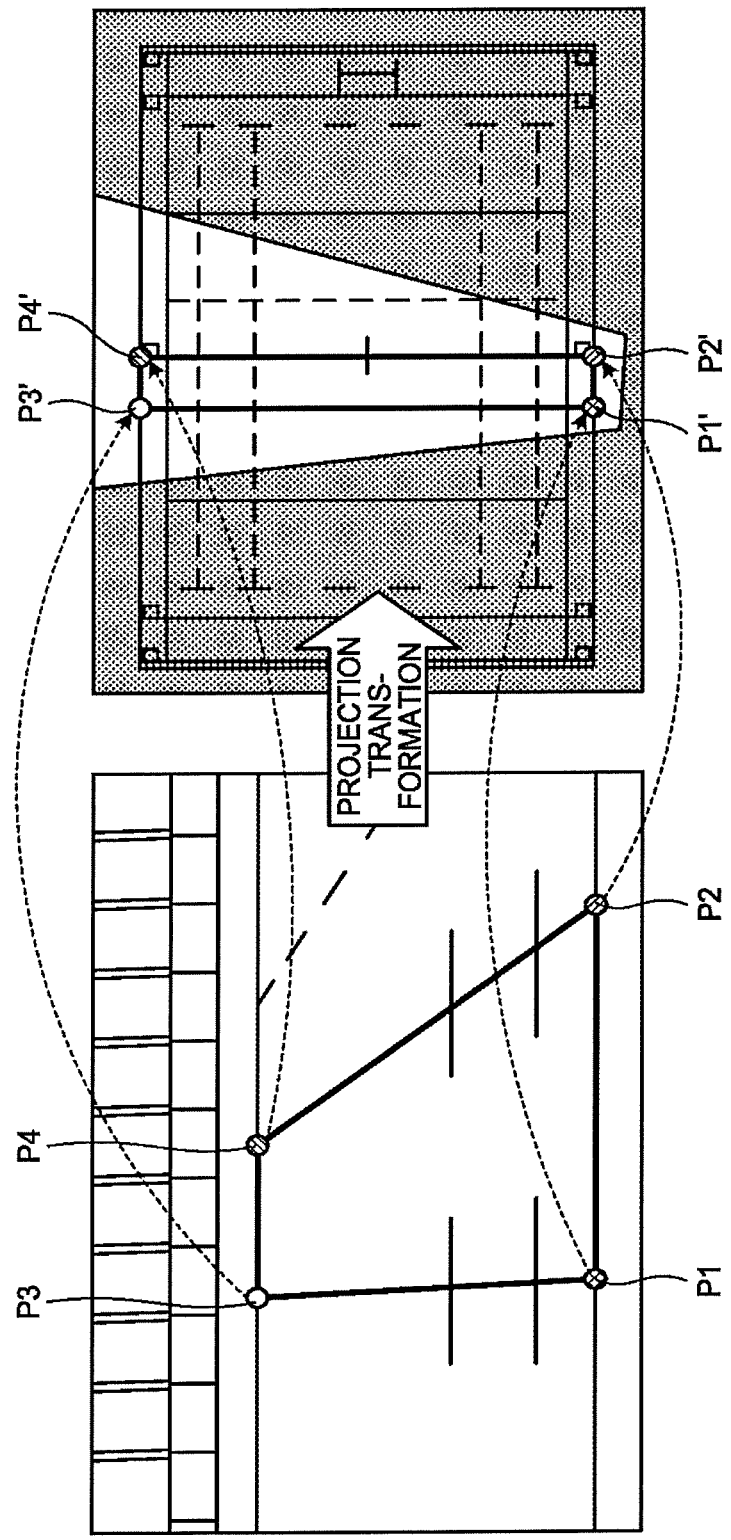
FIG. 3 is a diagram illustrating an example of a method of deriving a projection transformation matrix.

The first trajectory generation function 12 generates a first trajectory that is a motion trajectory of a player in the field coordinate system detected by the detection function 11 from the video. The first trajectory generation function 12 derives a projection transformation matrix to transform the coordinate system of the video into the field coordinate system by using correspondence of feature points in the video to feature points in the field. FIG. 3 is a diagram illustrating an example of a method of deriving a projection transformation matrix. In FIG. 3, for example, four angular points of a rectangular defined by certain line segments in the field are determined to be feature points. FIG. 3 illustrates an example of deriving a projection transformation matrix that transforms coordinates of four angular points P1, P2, P3, and P4 in the video into coordinates of four angular points P1', P2', P3', and P4' in the field coordinate system. The hatched area in the field coordinate system represents an area out of a capture range and thus the area is not captured by the camera.

Figure 4:
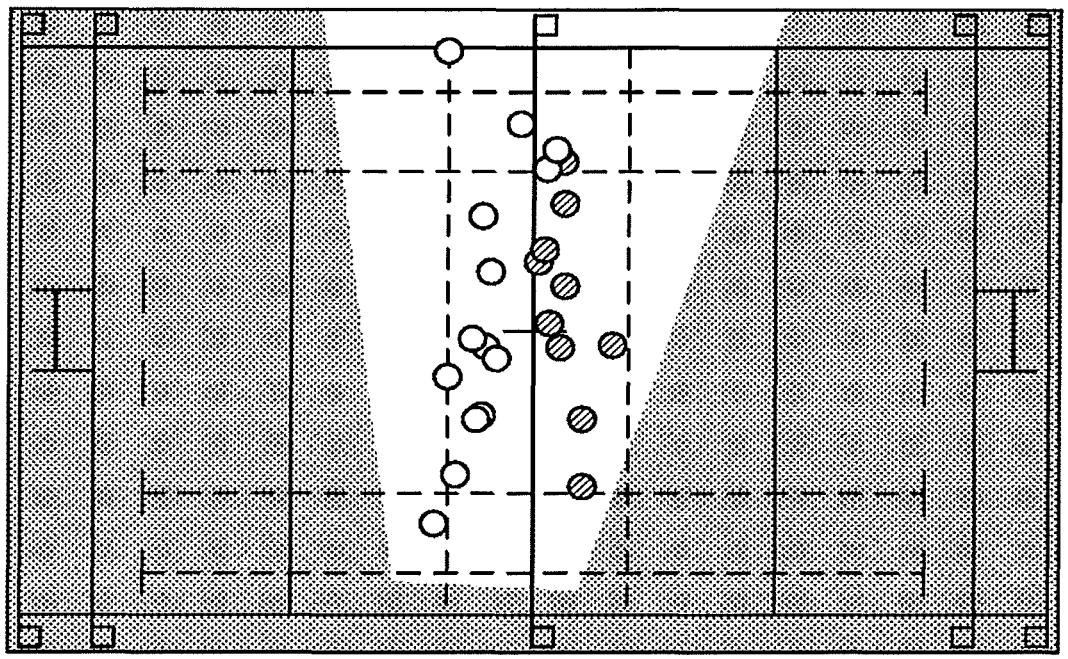
FIG. 4 is a diagram illustrating a field coordinate system in which positions of players detected from the video are mapped.

The first trajectory generation function 12 maps the position of a player detected by the detection function 11 from the video in the field coordinate system by using the projection transformation matrix, and estimates the position of the player in the field coordinate system. FIG. 4 illustrates the field coordinate system in which positions of players detected from the video are mapped. In FIG. 4, positions of the players in the video illustrated in FIG. 2 are mapped in the field coordinate system.

Figure 5:
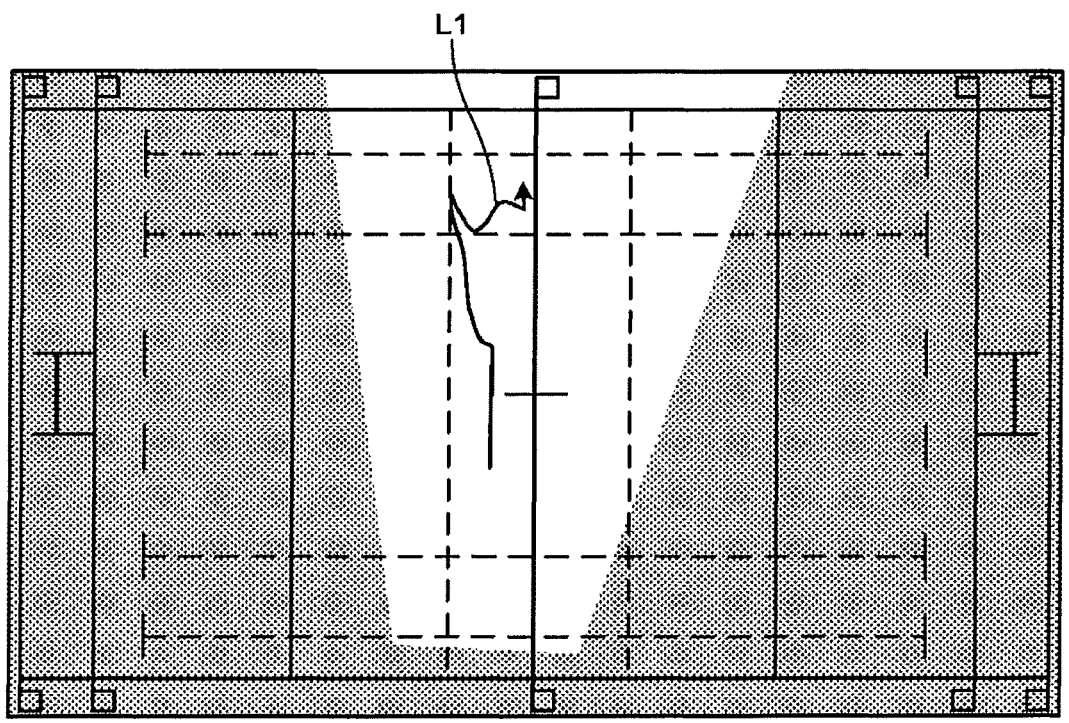
FIG. 5 is a diagram illustrating an example of a first trajectory.

The first trajectory generation function 12 repeats the process of mapping by using the projection transformation matrix and estimating a position of a player in the field coordinate system every time a player is detected from the video by the detection function 11. The first trajectory generation function 12 generates a tracklet of the player by performing, for example, optimization based on dynamic programming using positions of the player in the field coordinate system and a similarity of image features (colors or texture of a detection area). The first trajectory generation function 12 then determines the tracklet to be a first trajectory that is a motion trajectory of the player in the field coordinate system. FIG. 5 illustrates an example of a first trajectory L1. The first trajectory L1 is generated for each player detected from the video, and represents the time-series motion of the player in the field coordinate system. Although an example of generating a tracklet in the field coordinate system has been described, the first trajectory generation function 12 may generate the tracklet in the coordinate system of the video, and map the tracklet in the field coordinate system by using the projection transformation matrix and generate the first trajectory L1.

Figure 6:
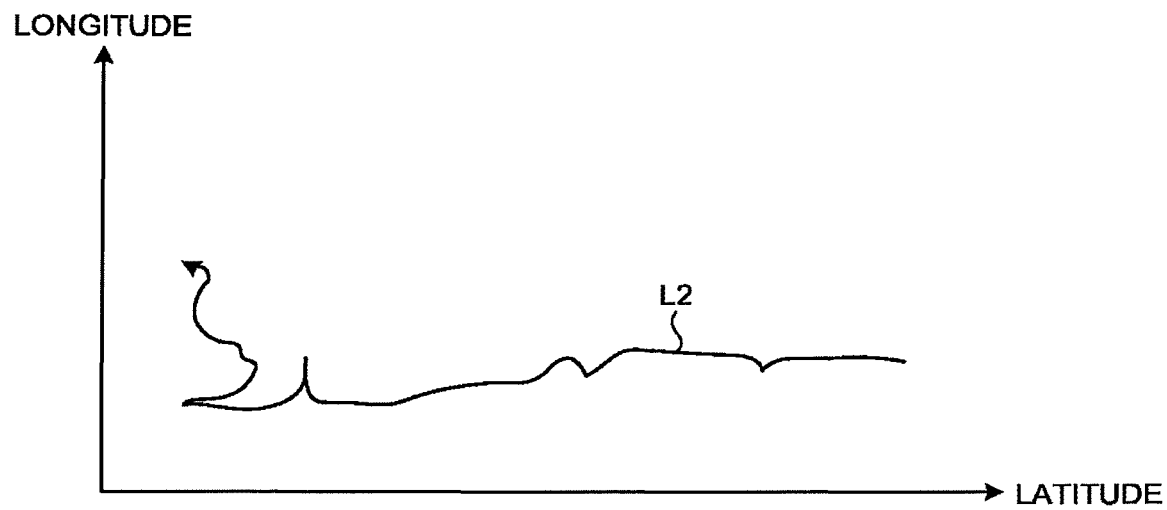
FIG. 6 is a diagram illustrating an example of a second trajectory.

The second trajectory generation function 13 generates a second trajectory from the time-series data of positional information output from the position sensor attached to a player during the game. The second trajectory is a motion trajectory of the player having the position sensor in the geographic coordinate system. FIG. 6 illustrates an example of a second trajectory L2. The second trajectory L2 is generated for each player who is equipped with the sensor, and represents the time-series motion of the player in the geographic coordinate system. With regard to a player who is not equipped with the sensor, the second trajectory L2 corresponding to the player is not generated. With regard to a player who is equipped with the sensor, the second trajectory L2 corresponding to the player is generated even in a time period in which the player is not captured by the camera and thus not in the video because of occlusion or because the player moves out of the capture range of the camera.

The trajectory matching function 14 associates a first trajectory L1 with a second trajectory L2 that are estimated to be the motion trajectory of the same player, based on a similarity in shape between the first trajectory L1 generated by the first trajectory generation function 12 and the second trajectory L2 generated by the second trajectory generation function 13. The similarity in shape between the first trajectory L1 and the second trajectory L2 can be determined by using, for example, higher-order local autocorrelation (HLAC) features. In other words, if the difference between an HLAC feature extracted from a first trajectory L1 and an HLAC feature extracted from a second trajectory L2 is equal to or lower than a certain threshold, the first trajectory L1 and the second trajectory L2 can be estimated to be the motion trajectory of the same player. For example, since the similarity in shape between the first trajectory L1 illustrated in FIG. 5 and the second trajectory L2 illustrated in FIG. 6 is high, the trajectories are estimated to be the motion trajectory of the same player and are associated with each other.

If the position sensor attached to a player is associated with unique information beforehand such as the player's uniform number for identifying the player and the unique information is added to the time-series data of positional information output from the position sensor, the first trajectory L1 can be associated with the second trajectory L2 more easily. In other words, if the unique information such as a uniform number of a player is detected together with the player from a video of a game captured by a camera, the trajectory matching function 14 may associate the first trajectory L1 indicating the time-series motion of the player in the field coordinate system with the second trajectory L2 generated from the time-series data of positional information to which the unique information such as the player's uniform number is added.

The deriving function 15 derives a transformation matrix M that transforms the geographic coordinate system that is the coordinate system of the position sensor into the field coordinate system by using the first trajectory L1 and the second trajectory L2 associated by the trajectory matching function 14. For example, the deriving function 15 derives the transformation matrix M that transforms the geographic coordinate system into the field coordinate system such that the transformation matrix M minimizes the differences between positions constituting the first trajectory L1 in the field coordinate system at respective instants of time and positions constituting the second trajectory L2 that has been translated from the geographic coordinate system into the field coordinate system at respective instants of time. The transformation matrix M can be derived from at least one pair of the first trajectory L1 and the second trajectory L2, but the transformation matrix M can be derived more accurately by using many pairs of trajectories.

The estimation function 16 maps the second trajectories L2 in the field coordinate system by using the transformation matrix M, and estimates the position of each player in the field coordinate system. For example, the estimator integrates a first trajectory L1 with a second trajectory L2 mapped in the field coordinate system by using the transformation matrix M for each player, and estimates the position of the player at each instant of time in the field coordinate system based on the integrated motion trajectory of the player. In other words, first, the estimation function 16 maps all the second trajectories L2 generated by the second trajectory generation function 13 in the field coordinate system by using the transformation matrix M derived by the deriving function 15. The estimation function 16 then groups all the first trajectories L1 generated by the first trajectory generation function 12 and all the second trajectories L2 mapped in the field coordinate system in accordance with the degree of overlap or continuity in the field coordinate system, and integrates a first trajectory L1 with a second trajectory L2 that are estimated to be the motion trajectory of the same player.

For example, for a time period in which a player having a position sensor is in a video captured by a camera, the second trajectory L2 indicating the time-series motion of the player in the geographic coordinate system is mapped in the field coordinate system to generally overlap the first trajectory L1 indicating the motion of the player. The estimation function 16 then integrates the first trajectory L1 with the second trajectory L2 mapped in the field coordinate system as a motion trajectory of one player in the field coordinate system.

Figure 7:
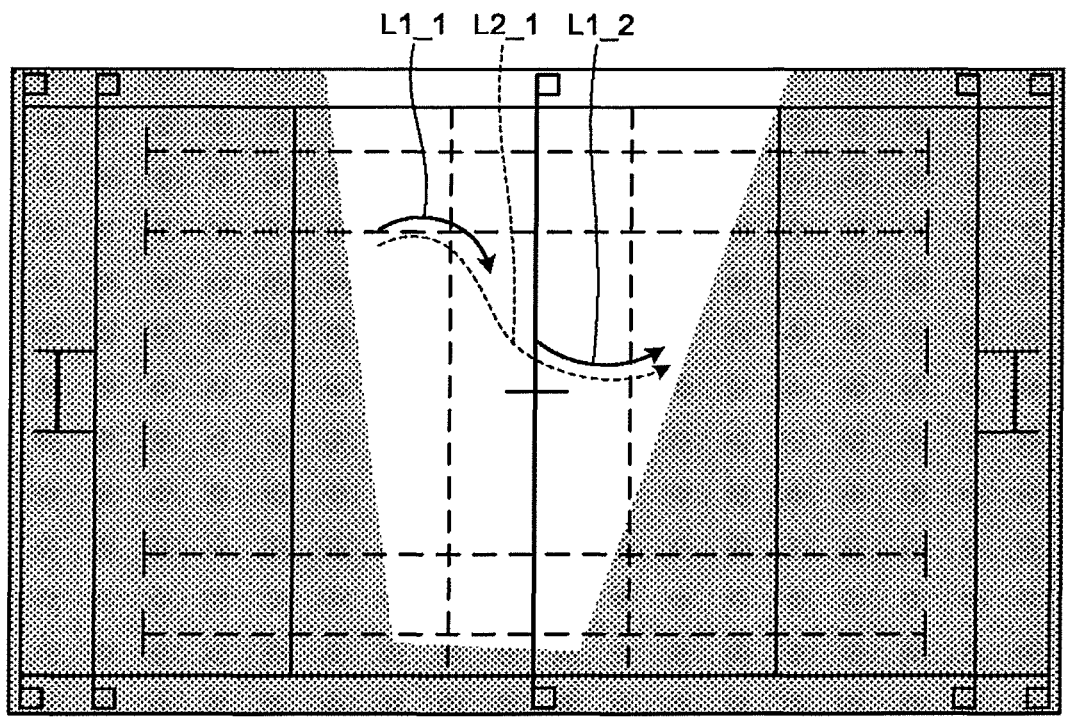
FIG. 7 is a diagram illustrating an example of interpolating a trajectory in a time period in which two first trajectories are disconnected, by using the second trajectory.

If there is a time period in which a player having a position sensor is temporarily not in the video captured by a camera because of occlusion, for example, a degree of overlap between a single second trajectory L2_1 mapped in the field coordinate system and two first trajectories L1_1 and L1_2 is high, and the two first trajectories L1_1 and L1_2 have continuity through the second trajectory L2_1 as illustrated in FIG. 7. In this case, the estimation function 16 integrates the two first trajectories L1_1 and L1_2 with the second trajectory L2_1 as a motion trajectory of one player in the field coordinate system. With this integration, the motion trajectory of the player in a time period of disconnection between the two first trajectories L1_1 and L1_2 that are motion trajectories of the player, that is, the motion trajectory of the player in a time period in which the player is not detected from the video because of occlusion and thus the first trajectory L1 is not generated, can be interpolated by using the second trajectory L2_1 mapped in the field coordinate system.

Figure 8:
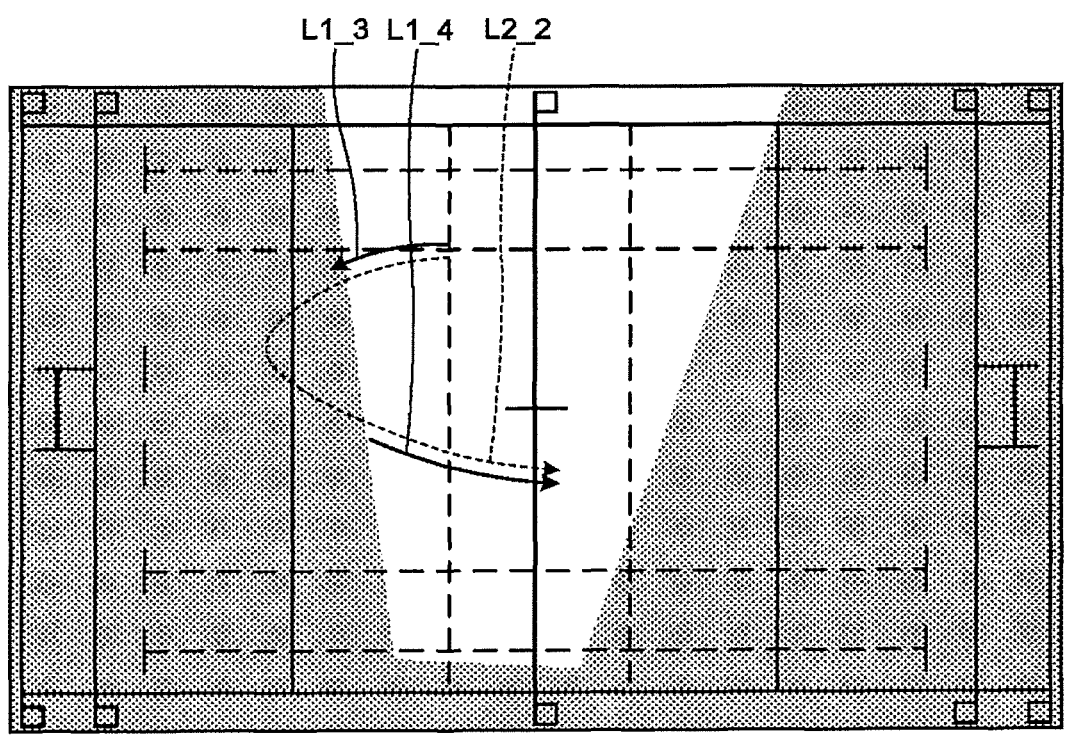
FIG. 8 is a diagram illustrating another example of interpolating a trajectory in a time period in which two first trajectories are disconnected, by using the second trajectory.

If there is a time period in which a player having a position sensor is not in the video captured by a camera because the player temporarily moves out of the capture range of the camera, for example, a degree of overlap between a single second trajectory L2_2 mapped in the field coordinate system and two first trajectories L1_3 and L1_4 may be high, and the two first trajectories L1_3 and L1_4 may have continuity through the second trajectory L2_2 as illustrated in FIG. 8. In this case, the estimation function 16 integrates the two first trajectories L1_3 and L1_4 with the second trajectory L2_2 as a motion trajectory of one player in the field coordinate system. With this integration, the motion trajectory of the player in a time period of disconnection between the two first trajectories L1_3 and L1_4 that are motion trajectories of the player, that is, the motion trajectory of the player in a time period in which the player moves out of the capture range of the camera and thus the first trajectory L1 is not generated, can be interpolated by using the second trajectory L2_2 mapped in the field coordinate system.

The estimation function 16 integrates the first trajectory L1 with the second trajectory L2 in the field coordinate system as described above, and estimates the motion trajectory of each player in the field coordinate system and estimates the position of the player at each instant of time. With regard to a player having a position sensor, if a position of the player on the first trajectory L1 and a position of the player on the second trajectory L2 mapped in the field coordinate system at the same instant of time do not match, that is, if there is a time instant at which the first trajectory L1 and the second trajectory L2 integrated as a motion trajectory of the same player do not overlap, the estimation function 16 estimates the position of the player at the time instant in accordance with certain reference criteria. For example, the estimation function 16 estimates (determines) the middle point between the position on the first trajectory L1 and the position on the second trajectory L2 at the time instant to be the position of the player at the time instant. The estimation function 16 may estimate (determine) one of the position on the first trajectory L1 and the position on the second trajectory L2 at the time instant that can create a smoother motion trajectory of the player to be the position of the player at the time instant. The estimation function 16 may obtain a new position that can create a smooth motion trajectory of the player, that is, a new position not on the first trajectory L1 or on the second trajectory L2 and may estimate (determine) the new position to be the position of the player at the time instant.

The estimation function 16 may calculate a smooth approximation curve by using an iteratively reweighed least squares method from the first trajectory L1 and the second trajectory L2 that are supposed to be integrated as a motion trajectory of a player in the field coordinate system, and may uniquely estimate the position of the player at each instant of time by determining the calculated approximation curve to be the motion trajectory of the player in the field coordinate system.

If there is a first trajectory L1 that cannot be integrated with any of the second trajectories L2 mapped in the field coordinate system, the estimation function 16 estimates that this first trajectory L1 is a motion trajectory of a player having no position sensor. In this case, the estimation function 16 estimates the position of the player in the field coordinate system at each instant of time only from the first trajectory L1.

The description above assumes that the time stamp of the video captured by the camera matches the time stamp of the positional information output from the position sensor attached to the player. However, it is not certain whether these time stamps match. If the time stamps do not match, the transformation matrix M described above may not be correctly derived and the accuracy in position estimation may be lowered.

In such a case, the deriving function 15 shifts one of the first trajectory L1 and the second trajectory L2 associated by the trajectory matching function 14 along the time axis to minimize the distance between the first trajectory L1 and the second trajectory L2, and derives the transformation matrix M. The deriving function 15 then calculates a time difference between the time stamp of the video captured by the camera and the time stamp of the positional information output from the position sensor from an amount of shift of the first trajectory L1 or the second trajectory L2 that has been shifted to minimize the distance between the trajectories.

Figure 9:
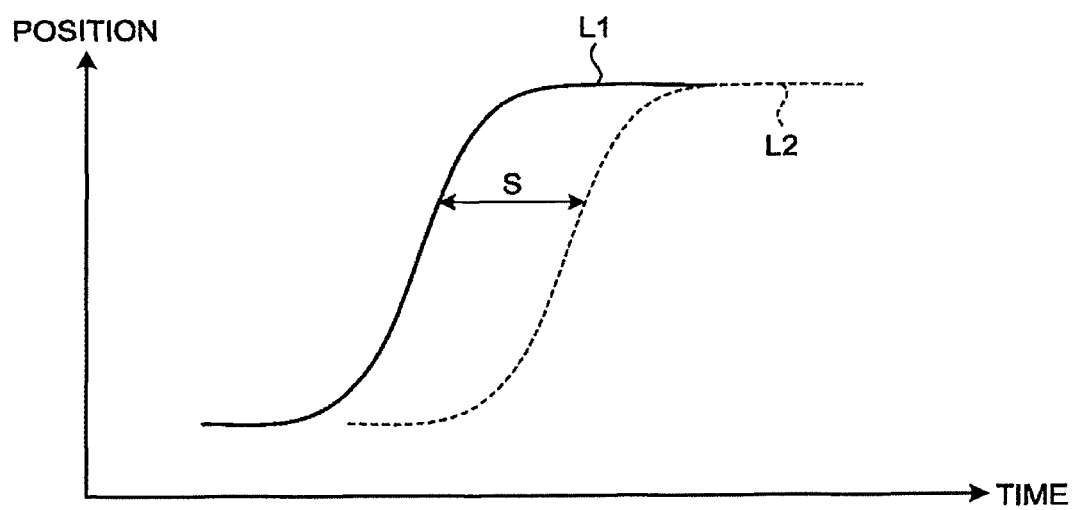
FIG. 9 is a diagram illustrating how a time difference between time stamps is calculated.

FIG. 9 is a diagram illustrating how a time difference between time stamps is calculated. The horizontal axis represents time, and the vertical axis virtually one-dimensionally represents a position at each instant of time. In the example of FIG. 9, the distance between the first trajectory L1 and the second trajectory L2 is minimized by shifting the first trajectory L1 or the second trajectory L2 along the time axis by a shift amount S. In this case, the deriving function 15 calculates the time difference corresponding to the shift amount S as the time difference between the time stamp of the video captured by the camera and the time stamp of the positional information output from the position sensor.

When the deriving function 15 calculates the time difference between time stamps as described above, the estimation function 16 shifts the first trajectory L1 or the second trajectory L2 mapped in the field coordinate system along the time axis in accordance with the time difference calculated by the deriving function 15, and integrates, in the same manner as described above, the first trajectory L1 with the second trajectory L2 that are estimated to be the motion trajectory of the same player. The estimation function 16 then estimates the motion trajectory of each player in the field coordinate system and estimates the position of the player at each instant of time. This configuration can accurately estimate the position of each player in the field coordinate system at each instant of time if the time stamp of the video captured by the camera does not match the time stamp of the positional information output from the position sensor.

FIG. 10 is a flowchart illustrating an example operation of the position estimation apparatus 1 (processing circuit 10) according to the embodiment described above. Details of each step in FIG. 10 have been specifically described above, and thus will be omitted as appropriate.

First, the detection function 11 of the processing circuit 10 detects players from a video of a game captured by a camera (Step S101). Then, the first trajectory generation function 12 of the processing circuit 10 generates first trajectories L1 that are motion trajectories of the players detected from the video at Step S101 in the field coordinate system (Step S102). The second trajectory generation function 13 of the processing circuit 10 generates second trajectories L2 from time-series data of positional information output from position sensors attached to the players during the game. The second trajectories L2 are motion trajectories of the players having the position sensors in the geographic coordinate system (Step S103). The process at Step S103 may be performed before the processes at Step S101 and Step S102.

The trajectory matching function 14 of the processing circuit 10 matches the first trajectories L1 generated at Step S102 against the second trajectories L2 generated at Step S103, and associates a first trajectory L1 with a second trajectory L2 that are estimated to be the motion trajectory of the same player based on an similarity in shape between the first trajectory L1 and the second trajectory L2 (Step S104). The deriving function 15 of the processing circuit 10 derives a transformation matrix M that transforms the geographic coordinate system into the field coordinate system such that the transformation matrix M minimizes the distance between the first trajectory L1 and the second trajectory L2 associated at Step S104 (Step S105).

Subsequently, the estimation function 16 of the processing circuit 10 maps all the second trajectories L2 generated at Step S103 in the field coordinate system by using the transformation matrix M derived at Step S105 (Step S106). The estimation function 16 of the processing circuit 10 integrates the respective first trajectories L1 generated at Step S102 with the corresponding second trajectories L2 mapped at Step S106, and estimates the positions of the players in the field coordinate system at each instant of time based on the integrated trajectories (Step S107).

As described above, the position estimation apparatus 1 according to the embodiment associates a first trajectory with a second trajectory that are estimated to be the motion trajectory of the same player, based on a similarity in shape between the first trajectory that is a motion trajectory of a player in the field coordinate system detected from a video captured by a camera and the second trajectory that is a motion trajectory of the player in the geographic coordinate system generated from time-series data of positional information output from a position sensor. The position estimation apparatus 1 then derives a transformation matrix that transforms the geographic coordinate system representing the positional information output from the position sensor into the field coordinate system such that the transformation matrix minimizes the distance between the first trajectory and the second trajectory associated with each other, and the second trajectory is mapped in the field coordinate system by using the transformation matrix. The position estimation apparatus 1 integrates the first trajectory with the second trajectory mapped in the field coordinate system to estimate the position of the player in the field coordinate system at each instant of time. The position estimation apparatus 1 according to the embodiment can accurately estimate the position of the player in the field coordinate system at each instant of time in a dame.

For example, even if there is a time period in which the player is not in the video captured by a camera because of occlusion or because the player moves out of the capture range of the camera, the position estimation apparatus 1 according to the embodiment can estimate the position of the player by interpolating the trajectory of the player by using the second trajectory. The position estimation apparatus 1 estimates the position of the player at each instant of time by using two trajectories that indicate the motion of the same player, and thus can be robust to noise in estimating the position.

In the embodiment above, the trajectory matching function 14 matches the first trajectories L1 in the field coordinate system against the second trajectories L2 in the geographic coordinate system and associates a first trajectory L1 with a second trajectory L2 that are estimated to be the motion trajectory of the same player, based on a similarity in shape between the first trajectory L1 and the second trajectory L2. However, the trajectory matching function 14 may project the first trajectories L1 and the second trajectories L2 in a common coordinate system and then match them, and may determine the similarity in shape between the trajectories. In this case, the similarity in shape between a first trajectory L1 and a second trajectory L2 can be determined more accurately.

In the embodiment above, although the second trajectories L2 representing time-series motions of the players in the geographic coordinate system are mapped in the field coordinate system, the second trajectories L2 may be translated into trajectories in the coordinate system of the camera and may be projected on the video captured by the camera and displayed on the display 60. This configuration allows the users who are viewing the video to retrospectively recognize the motions of the players in the video.

Although the embodiment above is about an application example to sport video analysis, the position estimation apparatus 1 according to the embodiment is not limited to the application to sport video analysis but can be used for various applications for estimating positions of moving objects through video analysis.

The processing functions of the position estimation apparatus 1 according to the embodiment above are implemented such that the position estimation apparatus 1 configured by, for example, a computer executes computer programs. In this case, the computer programs executed by the position estimation apparatus 1 according to the embodiment above may be stored in a computer connected to a network such as the Internet and provided by being downloaded via the network. Furthermore, the computer programs executed by the position estimation apparatus 1 according to the embodiment above may be provided or distributed via a network such as the Internet. The computer programs executed by the position estimation apparatus 1 according to the embodiment above may be embedded and provided in a nonvolatile storage medium such as a read-only memory (ROM).

According to the transformation matrix deriving device, the position estimation apparatus, the transformation matrix deriving method, and the position estimation method of at least one embodiment described above, it is possible to accurately estimate a position of a moving object at each instant of time.

While certain embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A transformation matrix deriving device position estimation apparatus, comprising:
   a first trajectory generator configured to generate a first trajectory that is a motion trajectory of a moving object in a first coordinate system, the moving object being detected from a video;
   a second trajectory generator configured to generate a second trajectory from time-series data of positional information output from a position sensor, the second trajectory being a motion trajectory of a moving object having the position sensor in a second coordinate system;
   a trajectory matcher configured to associate the first trajectory with the second trajectory, the first trajectory and the second trajectory being estimated to be a motion trajectory of a same moving object based on a similarity between the first trajectory and the second trajectory;
   a deriver configured to derive a transformation matrix that transforms the second coordinate system into the first coordinate system by using the first trajectory and the second trajectory associated with each other; and
   an estimator configured to estimate a position of the moving object in the first coordinate system by mapping the second trajectory in the first coordinate system by using the transformation matrix,
   wherein the estimator integrates the first trajectory with the second trajectory mapped in the first coordinate system for each moving object and estimates a position of the moving object in the first coordinate system at each instant of time based on an integrated motion trajectory of the moving object,
   the deriver further calculates a time difference between a time stamp of the video captured by a camera and a time stamp of positional information output from the position sensor, from an amount of shift by which the first trajectory or the second trajectory is shifted along a time axis to minimize a distance between the first trajectory and the second trajectory associated with each other, and
   the estimator shifts the first trajectory or the second trajectory mapped in the first coordinate system along the time axis in accordance with the time difference, and integrates the first trajectory with the second trajectory mapped in the first coordinate system for each moving object.

2. The position estimation apparatus according to claim 1, wherein
   the position sensor is associated with unique information identifying the moving object having the position sensor, and
   when the unique information on the moving object is detected together with the moving object from the video, the trajectory matcher associates the first trajectory of the moving object with the second trajectory generated from the time-series data of positional information output from the position sensor associated with the unique information on the moving object.

3. The position estimation apparatus according to claim 1, wherein the trajectory matcher determines the similarity by projecting the first trajectory and the second trajectory in a common coordinate system.

4. The position estimation apparatus according to claim 1, further comprising a video display configured to project the second trajectory on the video to display the video.

5. The position estimation apparatus according to claim 1, wherein the estimator interpolates the motion trajectory of the moving object having the position sensor in a time period in which the moving object is not detected from the video and in which the first trajectory of the moving object is not generated, by using the second trajectory mapped in the first coordinate system.

6. The position estimation apparatus according to claim 1, wherein, when a position of the moving object having the position sensor on the first trajectory and a position of the moving object on the second trajectory mapped in the first coordinate system at a same instant of time do not match, the estimator estimates a middle point between the positions, one of the positions that creates a smoother motion trajectory of the moving object, or a new position that creates a smoother motion trajectory of the moving object to be the position of the moving object.

7. The position estimation apparatus according to claim 1, wherein, when there is a first trajectory that is not integrated with any second trajectory mapped in the first coordinate system, the estimator estimates that the first trajectory is a motion trajectory of a moving object not having the position sensor, and estimates a position of the moving object in the first coordinate system only from the first trajectory.

8. A position estimation apparatus, comprising:
   a first acquirer configured to acquire a transformation matrix that transforms a second coordinate system into a first coordinate system;
   a second acquirer configured to acquire a motion trajectory of a moving object having a position sensor in the second coordinate system, the motion trajectory being generated from time-series data of positional information output from the position sensor; and
   an estimator configured to estimate a position of the moving object in the first coordinate system by mapping the motion trajectory represented in the second coordinate system in the first coordinate system by using the transformation matrix, wherein
   the estimator is further configured to integrate the first trajectory with the second trajectory mapped in the first coordinate system for each moving object and estimates a position of the moving object in the first coordinate system at each instant of time based on an integrated motion trajectory of the moving object,
   a time difference is calculated between a time stamp of the video captured by a camera and a time stamp of positional information output from the position sensor, from an amount of shift by which the first trajectory or the second trajectory is shifted along a time axis, to minimize a distance between the first trajectory and the second trajectory associated with each other, and
   the estimator is further configured to shift the first trajectory or the second trajectory mapped in the first coordinate system along the time axis in accordance with the time difference, and integrates the first trajectory with the second trajectory mapped in the first coordinate system for each moving object.

9. A method of estimating a position, comprising:
generating a first trajectory that is a motion trajectory of a moving object in a first coordinate system, the moving object being detected from a video;
generating a second trajectory from time-series data of positional information output from a position sensor, the second trajectory being a motion trajectory of a moving object having the position sensor in a second coordinate system;
associating the first trajectory with the second trajectory, the first trajectory and the second trajectory being estimated to be a motion trajectory of a same moving object, based on a similarity between the first trajectory and the second trajectory;
deriving a transformation matrix that transforms the second coordinate system into the first coordinate system by using the first trajectory and the second trajectory associated with each other; and
estimating a position of the moving object in the first coordinate system by mapping the second trajectory in the first coordinate system by using the transformation matrix, wherein
the estimating step further comprises integrating the first trajectory with the second trajectory mapped in the first coordinate system for each moving object and estimating a position of the moving object in the first coordinate system at each instant of time based on an integrated motion trajectory of the moving object,
the deriving step further comprises calculating a time difference between a time stamp of the video captured by a camera and a time stamp of positional information output from the position sensor, from an amount of shift by which the first trajectory or the second trajectory is shifted along a time axis to minimize a distance between the first trajectory and the second trajectory associated with each other, and
the estimating step further comprises shifting the first trajectory or the second trajectory mapped in the first coordinate system along the time axis in accordance with the time difference, and integrating the first trajectory with the second trajectory mapped in the first coordinate system for each moving object.

10. A method of estimating a position, comprising:
acquiring a transformation matrix that transforms a second coordinate system into a first coordinate system;
acquiring a motion trajectory of a moving object having a position sensor in the second coordinate system, the motion trajectory being generated from time-series data of positional information output from the position sensor; and
estimating a position of the moving object in the first coordinate system by mapping the motion trajectory represented in the second coordinate system in the first coordinate system by using the transformation matrix, wherein
the estimating step further comprises integrating the first trajectory with the second trajectory mapped in the first coordinate system for each moving object and estimating a position of the moving object in the first coordinate system at each instant of time based on an integrated motion trajectory of the moving object,
a time difference is calculated between a time stamp of the video captured by a camera and a time stamp of positional information output from the position sensor, from an amount of shift by which the first trajectory or the second trajectory is shifted along a time axis to minimize a distance between the first trajectory and the second trajectory associated with each other, and
the estimating step further comprises shifting the first trajectory or the second trajectory mapped in the first coordinate system along the time axis in accordance with the time difference, and integrating the first trajectory with the second trajectory mapped in the first coordinate system for each moving object.

* * * * *